(12) United States Patent
Huang et al.

(10) Patent No.: US 7,510,155 B2
(45) Date of Patent: Mar. 31, 2009

(54) SINGLE SPRING SUPPORTING DEVICE

(75) Inventors: Shian-Nung Huang, 6F., No. 261, Sec. 2, Jincheng Rd., Tucheng City, Taipei County 236 (TW); Ming-Tsung Hsieh, Tucheng (TW)

(73) Assignee: Shian-Nung Huang, Taipei (TW)

( * ) Notice: Subject to any disclaimer, the term of this patent is extended or adjusted under 35 U.S.C. 154(b) by 0 days.

(21) Appl. No.: 11/772,561

(22) Filed: Jul. 2, 2007

(65) Prior Publication Data

US 2009/0008524 A1 Jan. 8, 2009

(51) Int. Cl.
*E04G 3/00* (2006.01)
(52) U.S. Cl. ............. 248/278.1; 248/919; 248/922
(58) Field of Classification Search ............. 248/278.1, 248/280.11, 284.1, 125.7, 917, 919, 920, 248/921, 922, 923; 361/682
See application file for complete search history.

(56) References Cited

U.S. PATENT DOCUMENTS 6,394,403 B1 * 5/2002 Hung ..................... 248/276.1
6,478,275 B1 * 11/2002 Huang .................... 248/284.1
2007/0040084 A1 * 2/2007 Sturman et al. ........ 248/280.11
2007/0262210 A1 * 11/2007 Oh et al. ................ 248/125.1
2008/0029661 A1 * 2/2008 Chen ..................... 248/176.1
2008/0029670 A1 * 2/2008 Hung .................... 248/278.1
2008/0117574 A1 * 5/2008 Lee ......................... 361/681

* cited by examiner

*Primary Examiner*—Ramon O Ramirez

(57) ABSTRACT

A single spring supporting device includes a connecting seat, a fixing seat, and a fixing mechanism. The connecting seat and the fixing seat are respectively connected to two sides of the fixing mechanism. The connecting seat is for connecting a display, while the fixing seat is for fixing the supporting device to a position. The fixing mechanism further has a holder, in which a blocking plate and a fixing rod are arranged. One side of the fixing rod is arranged through the blocking plate. An elastic element, in addition, is arranged through the fixing rod, another side of which is rotationally connected to a nut. The display is adjusted to an optimally viewing angle by in cooperation with the blocking plate to control a telescoping operation of the elastic element and by adjusting the relative angles of the fixing mechanism with respect to the connecting seat and the fixing seat.

6 Claims, 6 Drawing Sheets

US 7,510,155 B2

SINGLE SPRING SUPPORTING DEVICE

BACKGROUND OF THE INVENTION

1. Field of the Invention

The present invention generally relates to a supporting device, in particular, to a support structure for supporting a display.

2. Description of Prior Art

Following the rapid development of science and technology, various electronic devices invented accordingly have brought different conveniences to people's living. A current display, in particular, may provide all kinds of messages, through data being transmitted and controlled by computer to thereby provide people with instant information. In order to match the arrangement of different positions of a display, a supporting device is provided and connected to the back thereof for fixing it to different positions and for fixing it with an optimally viewing angle through connected operation.

A prior supporting device, commonly seen in current market, includes a connecting seat, a fixing seat, and a fixing mechanism. The connecting seat and the fixing seat are respectively pivoted to two sides of the fixing mechanism. The angles of the fixing mechanism relative to the connecting seat and the fixing seat are adjusted through the pivoting operation. The connecting seat is directly connected to the display, while the fixing seat is fixed to a fixed position, for example, to a desk surface, for fixing the entire supporting device. The fixing device further includes a holder, at interior of which an elastic operation of a plurality of springs is applied as a source of supporting force for the entire fixing mechanism.

According to the fixing mechanism mentioned thereinbefore, the springs are acted as a mainly supporting source for the structure. A plurality of springs, therefore, are for connecting the pivoting positions of the fixing mechanism relative to the connecting seat and the fixing seat in order to enhance the supporting force. The plural springs, in the meantime, are crosswise assembled for enhancing the endurance thereof.

However, since the difference between the arranging direction of the springs and the operating direction of the fixing mechanism relative to the connecting seat and the fixing seat is ignored in this structure's arrangement, the structure of the springs are vulnerable to deformation, influencing the telescoping operation of the springs themselves, which becomes one of the shortcomings. In addition, the operation of a plurality of springs will increase the structure's cost, which becomes a defect of the structure, otherwise it will be perfect.

SUMMARY OF THE INVENTION

The invention is to provide a single spring supporting device for supporting a display. An elastic element is arranged along the actuation direction in a fixing mechanism of the supporting device. In cooperation with the operation of a blocking plate and a locking element, the elastic element, not only may proceed a linear telescoping process same as the operational manner of the supporting device, but also may possess the originally supporting force, further enhancing the endurance thereof.

The invention is mainly to provide a single spring supporting device including a connecting seat, a fixing seat, and a fixing mechanism. The connecting seat and the fixing seat are respectively connected to two sides of the fixing mechanism. The connecting seat is for connecting a display, while the fixing seat is for fixing the supporting device to a position. The fixing mechanism further has a holder, in which a blocking plate and a fixing rod are arranged. One side of the fixing rod is arranged through the blocking plate. An elastic element, in addition, is arranged through the fixing rod, another side of which is rotationally connected to a nut. The display is adjusted to an optimally viewing angle by in cooperation with the blocking plate to control a telescoping operation of the elastic element and by adjusting the relative angles of the fixing mechanism with respect to the connecting seat and the fixing seat.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
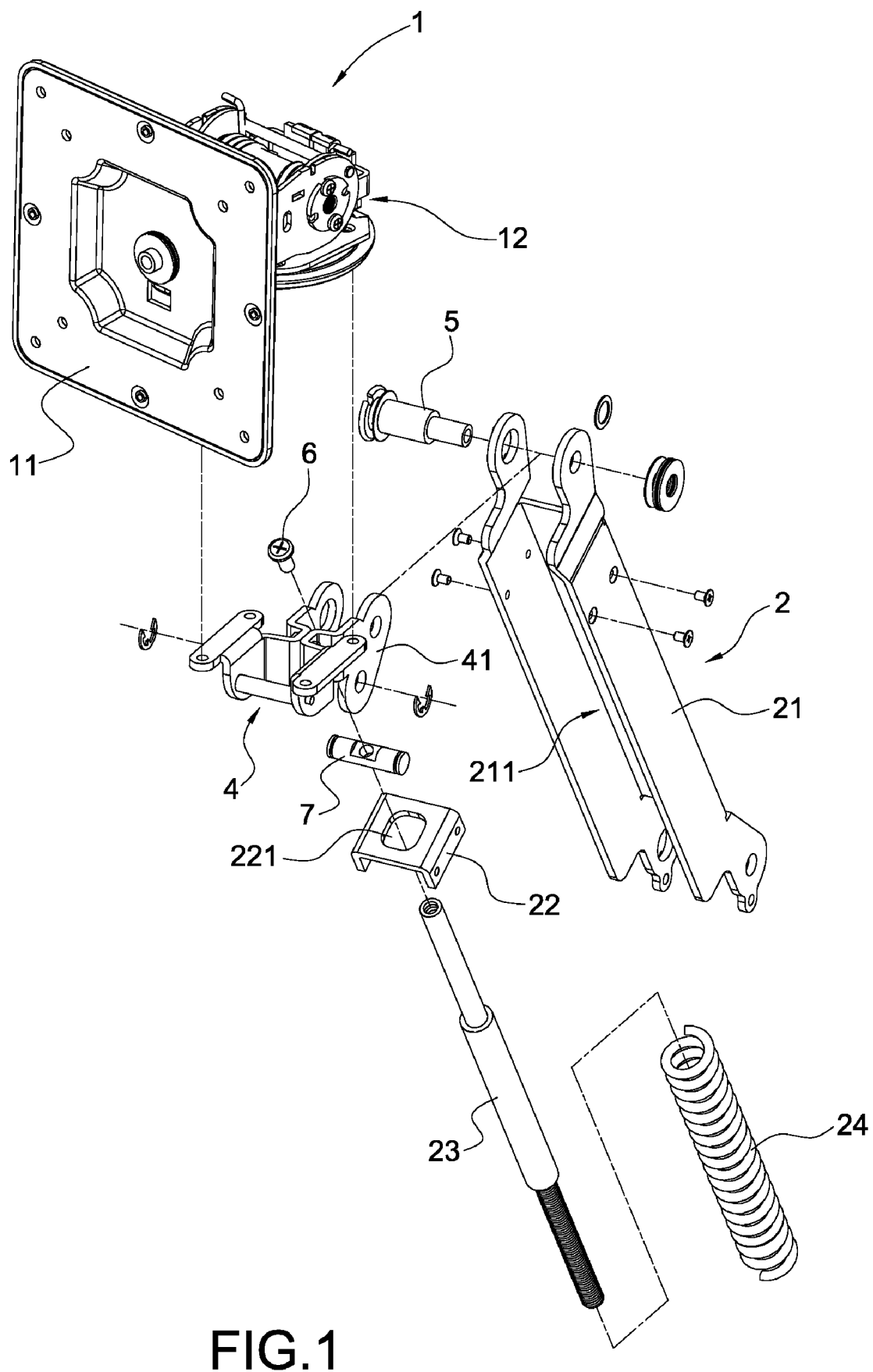
FIG. 1 is a perspective view explosively showing the structure of the present invention.
Figure 2:
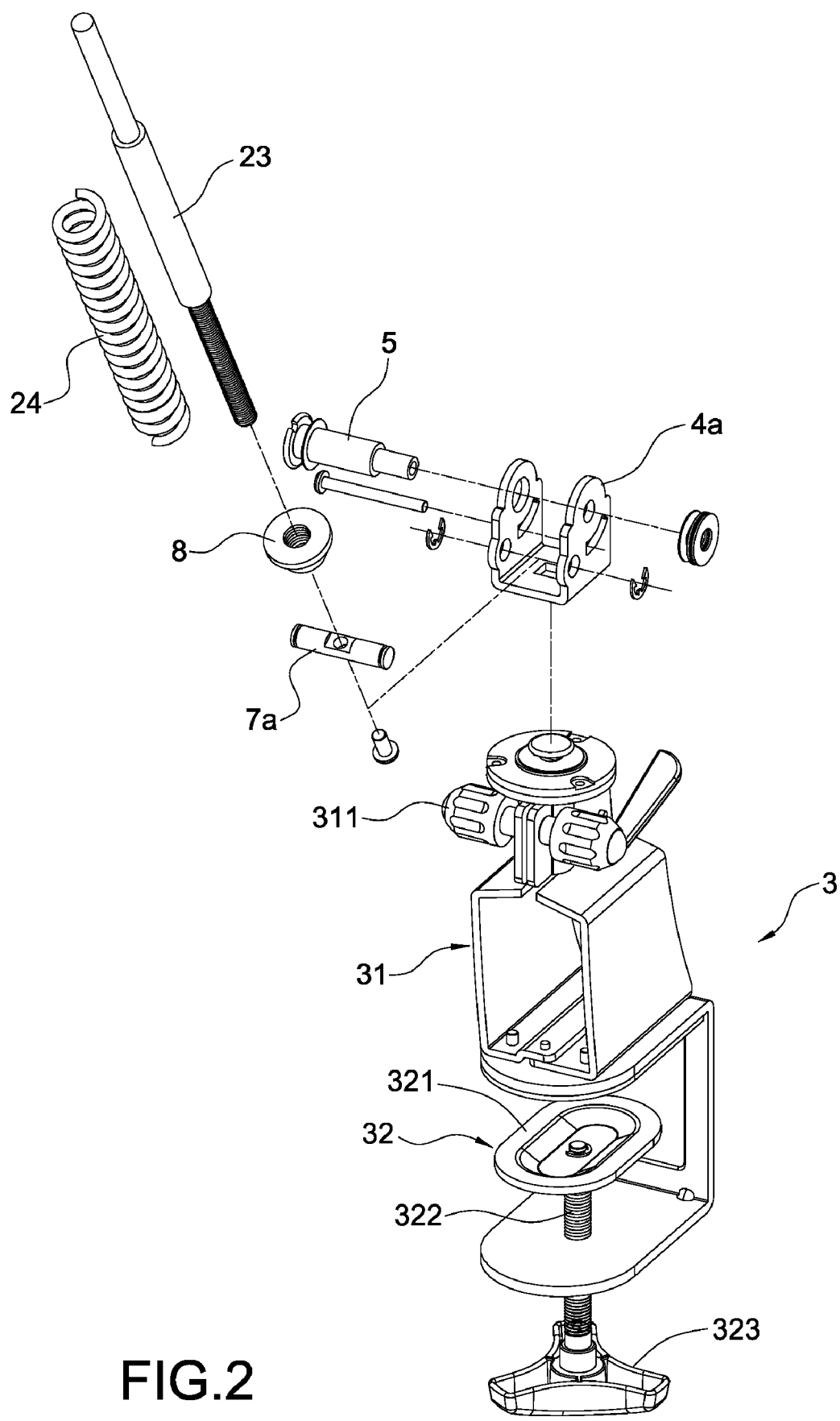
FIG. 2 is another perspective view explosively showing the structure of the present invention.
Figure 4:
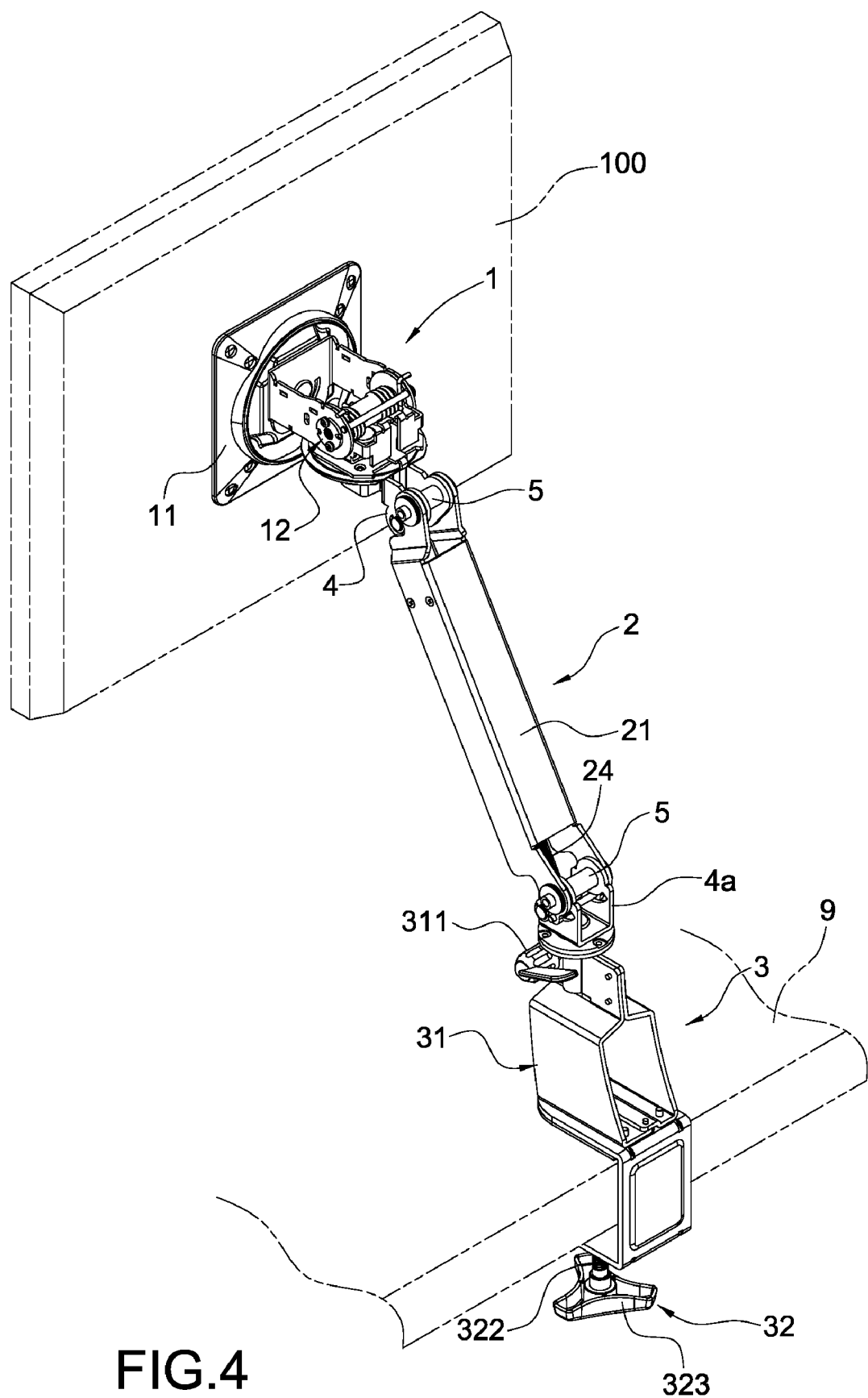
FIG. 4 is an application illustration according to the present invention.

Please refer to FIG. 1 and FIG. 2 that are perspective views explosively showing the structure of the present invention. As shown in these figures, a supporting structure according to the present invention mainly includes a connecting seat 1, a fixing mechanism 2, and a fixing seat 3. The connecting seat 1, in the meantime, has a supporting plate 11 and a rotational mechanism 12. The supporting plate 11 is for connecting a display 100, as shown in FIG. 4. The rotational mechanism 12 is connected to the bottom position of the supporting plate 11. The angle of the supporting plate 11 may be adjusted under the bringing along action of the rotational mechanism 12. The bottom of the rotational mechanism 12 is connected to a pivoting seat 4, one side of which has a connecting side 41 that is pivoted the fixing mechanism 2 by means of a pivoting element 5. After the fixing mechanism 2 being connected via the pivoting seat 4, an assembled structure with large angle is formed between the fixing mechanism 2 and the connecting seat 1. The fixing mechanism 2 includes a holder 21, the framework of which is shown as an "Π"-shape, the interior of which has an accommodating space 211, the upper position of which is arranged a blocking plate 22, on the plate body of which has a hole 221. A fixing rod 23 is arranged in the interior of the accommodating space 211. Another side of the fixing rod 23 is arranged through the hole 221 of the blocking plate 22. After passing through the hole 221, one side of the fixing rod 23 is directly pivoted to the pivoting seat 4 through a pivoting manner, e.g., a pillar body 7 via a locking element 6. The pillar body 7, in the meantime, is pivoted to the pivoting seat 4 to form a connection between one side of the fixing rod 23 and the pivoting seat 4. An elastic element 24, in addition, is fitted onto the rod body of the fixing rod 23. In this embodiment, the elastic element 24 is a linear spring abutted against the blocking plate 22. Another side of the fixing rod 23 is rotationally connected to a nut 8 in cooperation with the blocking plate 22 to control the telescoping length of the elastic element 24, as shown in FIG. 2. Another side of the fixing rod 23 is further arranged through and connected to a pillar body 7a for connecting the fixing seat 3. Referring to FIG. 1 and FIG. 2, a pivoting axis where the fixing mechanism 2 pivots at the pivoting seat 4 is misaligned with a pivoting axis where the fixing rod 23 pivots at the pivoting seat 4.

Figure 3:
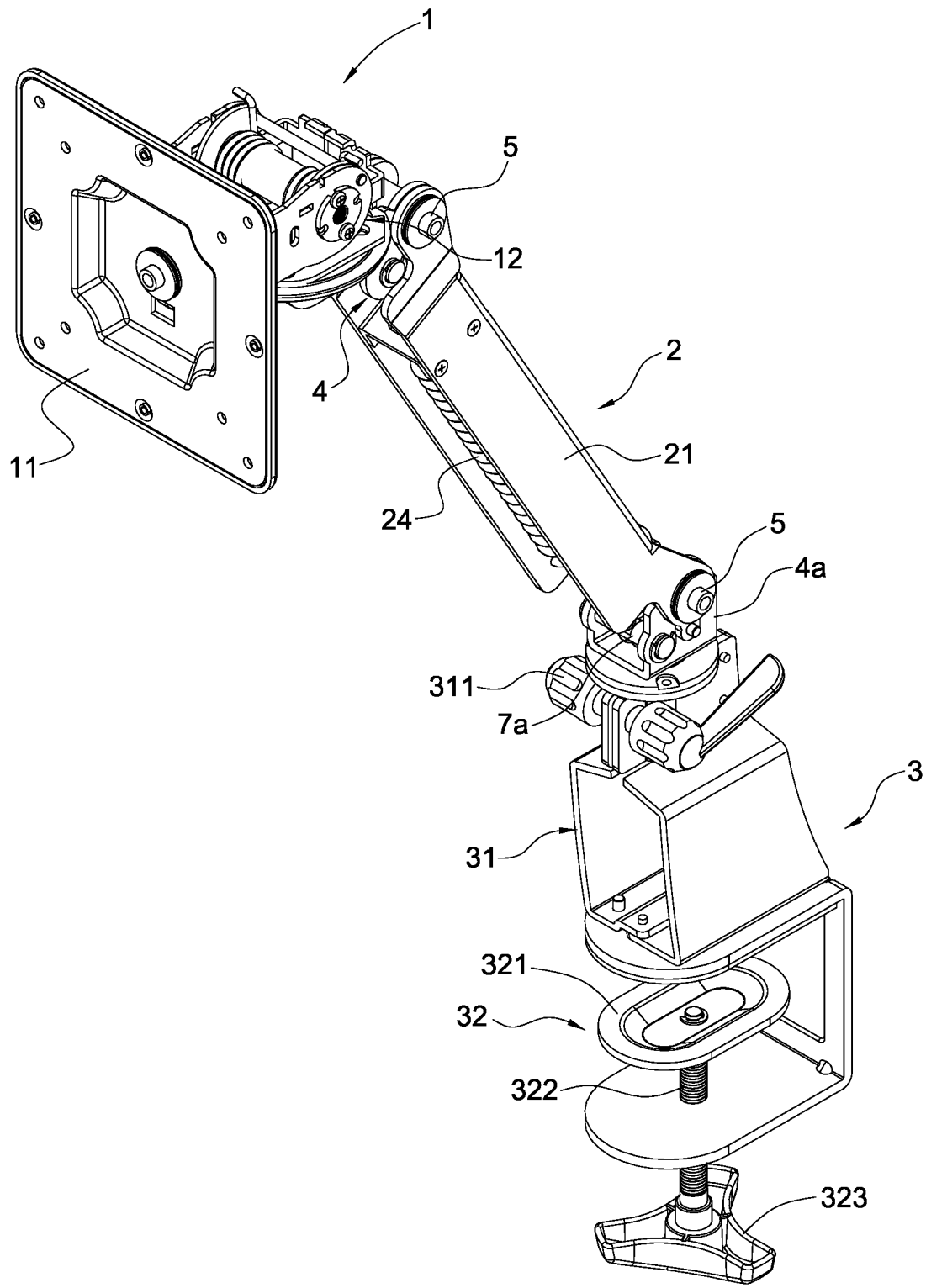
FIG. 3 is an assembled view of an outer appearance of the present invention.

Please refer to FIG. 2 continuously. The fixing mechanism 2 and the fixing seat 3 are interconnected via a pivoting seat 4a. The holder 21 of the fixing mechanism 2 is connected to the pivoting seat 4a via the pivoting element 5, while the pillar body 7a is pivoted onto the pivoting seat 4a. The pivoting seat 4a, in addition, is locked to the top of the fixing seat 3 that includes a clipping frame body 31 and a locking stand 32. The clipping frame body 31 is a hollow frame case for clipping a fixed object (not shown in the figures). A turning knob 311 is arranged at top of the clipping frame body 31 for pressing the fixed object that is clipped by the clipping frame body 31. The locking stand 32, in addition, is connected to the bottom part of the clipping frame body 31. The bottom side of the locking stand 32 is arranged through a pressing plate 321 available for rotation. The pressing plate 321, on the other hand, is connected to a rotational shaft 322, another side of which is connected to a rotational knob 323. The rotational knob 323 may be rotated to bring along the rotational shaft 322 to move the position of the pressing plate 321. The assembled device is as shown in FIG. 3.

Figure 5:
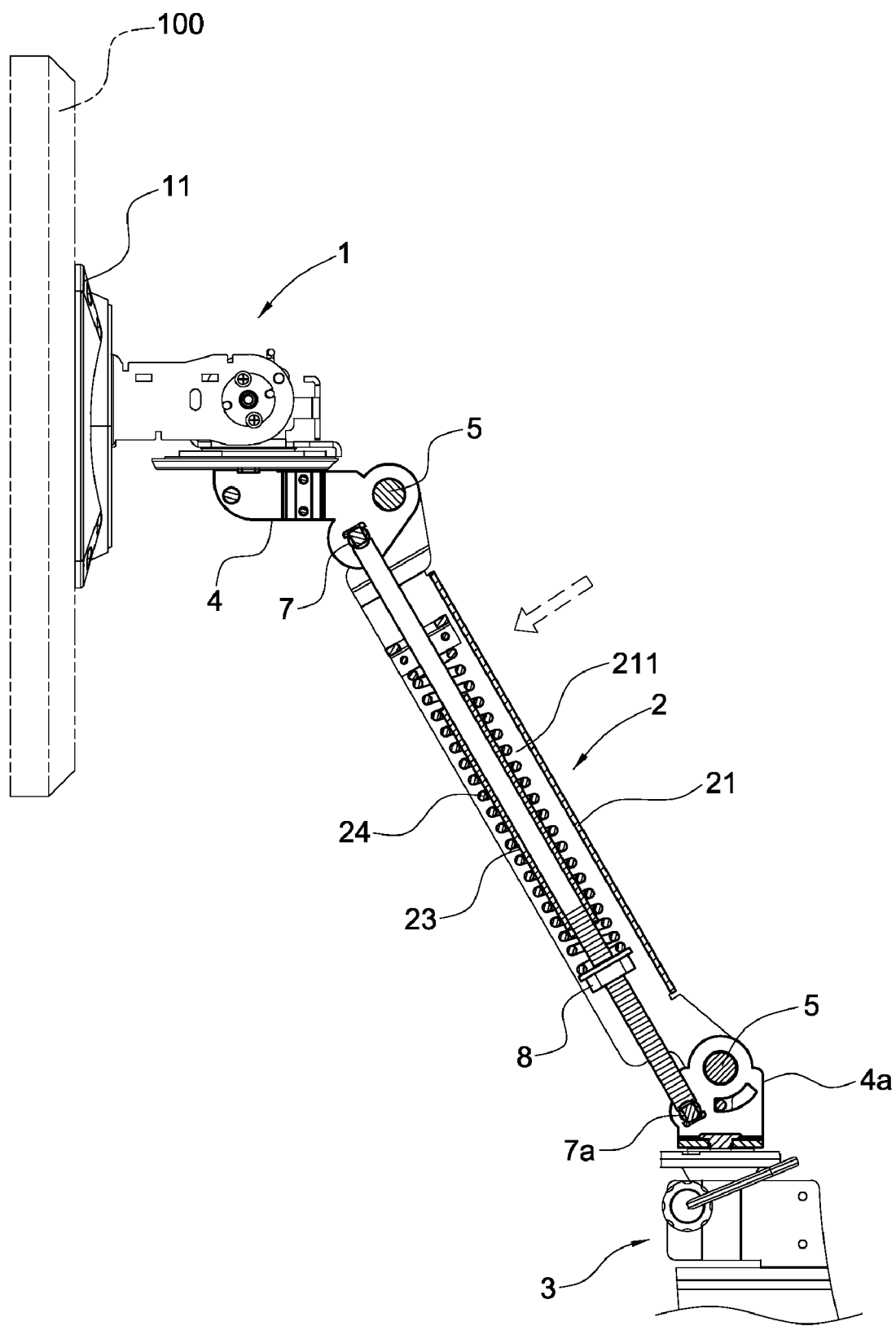
FIG. 5 is an operational illustration according to the present invention.
Figure 6:
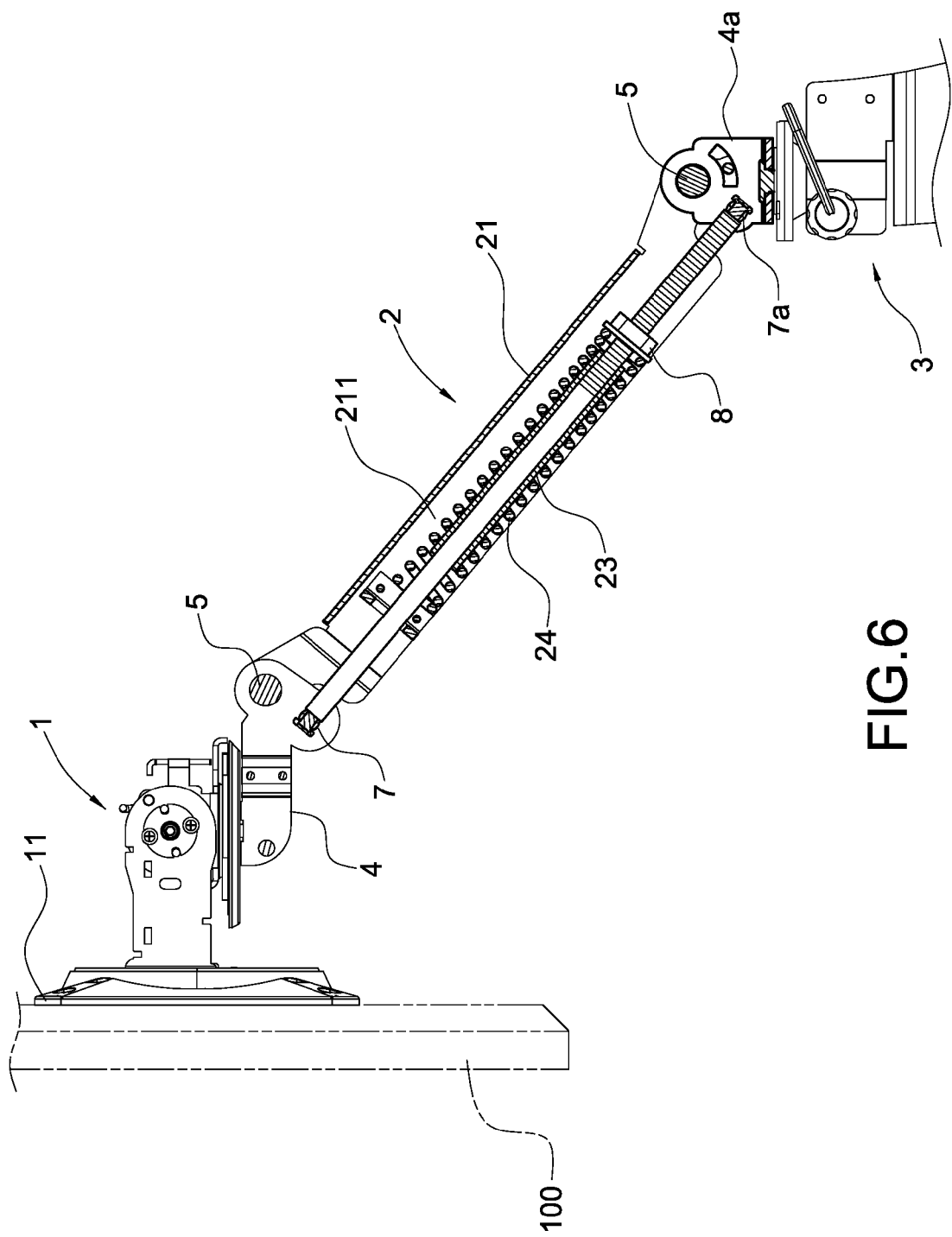
FIG. 6 is another operational illustration according to the present invention.

Please refer to FIG. 4 that is an operational illustration of the present invention. As shown in this figure, the supporting plate 11 at the front side of the connecting seat 1 is applied for the connection of a display 100, while the fixing seat 3 at the bottom part of the support structure is clipped against and connected to a desk surface 9 for fixing the support's position and in turn supporting the display 100. If it is intended to lower down the viewing angle of the display 100, as shown in FIG. 5, the angle between the fixing mechanism 2 and the fixing seat 3 has to be adjusted firstly. Since the angle of the display 100 is lowered down, the clipping space between the fixing mechanism 2 and the connecting seat 3 is shrunk. Thereby, the nut 8 fitted onto the fixing rod 23 must be turned loose to compress the elastic element 24 that is arranged through the fixing rod 23, making the elastic element 24 generate linear extension and substantially shrinking the space occupied by the fixing rod 23, so that there is enough space available for the fixing mechanism 2 to be bent downwardly. In the meantime, the relative angle between the connecting seat 1 and the fixing mechanism 2 is further adjusted to thereby adjust the display 100 to an optimal position.

However, the aforementioned description is only a preferable embodiment according to the present invention, being not used to limit the patent scope of the invention, so equivalently structural variation made to the contents of the present invention, for example, description and drawings, is all covered by the claims claimed thereinafter.

What is claimed is:

1. A single spring supporting device for supporting a display, comprising:
   a connecting seat, which is for connecting a display;
   a first pivoting seat connected to the connecting seat;
   a fixing mechanism, one side of which is pivotally connected to the first pivoting seat at a first pivot axis, and further comprising:
   a holder, in which an accommodating space is arranged;
   a blocking plate, which is fixed to one side of the accommodating space, and on which a hole is arranged;
   a fixing rod, which is arranged in the accommodating space, and one side of which is arranged through the hole and directly pivotally connected to the first pivoting seat at a second pivot axis which is misaligned with the first pivot axis;
   an elastic element, which is arranged through the fixing rod, and one side of which is abutted against the blocking plate;
   a nut, which is rotationally connected to another side of the fixing rod for controlling a telescoping length of the elastic element; and
   a fixing seat, which is connected to another side of the fixing mechanism for being fixed to a position.

2. The single spring supporting device according to claim 1, wherein the connecting seat further includes a supporting plate and a rotational mechanism connected to the first pivoting seat.

3. The single spring supporting device according to claim 1, wherein the elastic element is a linear spring.

4. The single spring supporting device according to claim 1, wherein a framework of the holder is shown as an "П"-shape.

5. The single spring supporting device according to claim 1, wherein the fixing mechanism is connected to the fixing seat via a second pivoting seat.

6. The single spring supporting device according to claim 5, wherein the fixing seat further includes a locking stand and a clipping frame body, one side of which is connected to the second pivoting seat, and another side of which is connected to the locking stand.

* * * * *